US006461060B1

(12) United States Patent
Omiya

(10) Patent No.: US 6,461,060 B1
(45) Date of Patent: Oct. 8, 2002

(54) CAMERA

(75) Inventor: Akio Omiya, Saitama (JP)

(73) Assignee: Fuji Photo Optical Co., LTD, Saitama (JP)

( * ) Notice: Subject to any disclaimer, the term of this patent is extended or adjusted under 35 U.S.C. 154(b) by 0 days.

(21) Appl. No.: 10/004,499

(22) Filed: Dec. 6, 2001

(30) Foreign Application Priority Data

Dec. 11, 2000 (JP) ........................................ 2000-375542

(51) Int. Cl.[7] .............................. G03B 1/00; G03B 17/02
(52) U.S. Cl. ........................ 396/415; 396/440; 396/538
(58) Field of Search ................................ 396/439, 536, 396/538, 539, 415, 416, 440

(56) References Cited

U.S. PATENT DOCUMENTS 5,984,535 A * 11/1999 Fukuda et al. .............. 396/411
6,078,749 A * 6/2000 Rydelek et al. .............. 396/6
6,249,646 B1 * 6/2001 Chen .............................. 396/6
6,328,486 B1 * 12/2001 Honda ........................ 396/415

FOREIGN PATENT DOCUMENTS

JP          6-43638          6/1994

* cited by examiner

Primary Examiner—David M. Gray
Assistant Examiner—Michelle Nguyen
(74) Attorney, Agent, or Firm—Arnold International; Bruce Y. Arnold

(57) ABSTRACT

A cassette chamber, a take-up chamber and a battery room are formed on a main body. A rear cover is attached to the main body. The rear cover is molded from plastics and integrated with an outer cover section and a frame section. In the frame section, a light-shielding segment is integrally formed. The light-shielding segment is positioned between the take-up chamber and the battery room in order to form a partition wall between these components.

5 Claims, 6 Drawing Sheets

CAMERA

BACKGROUND OF THE INVENTION

1. Field of the Invention

The present invention relates to a camera, and more particularly to a camera providing a rear cover molded from plastics.

2. Description Related to the Prior Art

Several kinds of cameras are recently supplied in the market. The cameras have a main body integrally formed with an exposure aperture and guide rails for guiding a photo film behind the exposure aperture, which causes a complex structure of the main body. The guide rails must be formed exactly, as they are planed, in order to make a precise regulation of the position of the photo film. However, the change of the molding temperature often has an influence on the main body. For example, a change of the temperature easily extends or shrinks materials such that the main body may have a deformed shape. Accordingly, the guide rails are hardly molded from plastics with high precision.

In order to solve the problem, the Japanese Utility Model Laid-Open Publication No. H6-43638 proposes a camera in which an exposure aperture and guide rails are integrated with a rear cover, and the rear cover is attached to a main body. In this camera, the influences during molding, for example deformation of the guide rails, become smaller, and the guide rails can be formed more precisely.

In the main body, a cassette chamber, a take-up chamber, a battery room and the like are formed. The main body is formed by molding plastic with a plurality of metallic molds having complex shapes. After molding the main body, the molds are retracted in several directions. The main body cannot have its parts in a region in which the metallic molds are retracted. Accordingly, there are some parts which cannot be integrally formed with the main body. Such parts are separately molded from plastics, and then fixed to the main body or the rear cover with screws and the like, which causes a complex process for production of the camera and increases the cost. Further, it is necessary to keep spaces for attachment of the parts. Accordingly, the camera hardly becomes smaller.

SUMMARY OF THE INVENTION

A main object of the present invention is to provide a camera which can be produced at a low cost.

Another object of the present invention is to provide a camera whose size is smaller.

Still another object of the present invention is to provide a camera in which some members are integrated with a rear cover.

In order to achieve the above objects, in a camera of the present invention, a rear cover is attached to a main body, and a cassette chamber and a take-up chamber are provided in respective both sides of the main body. The rear cover includes an outer cover section and a frame section. In the frame section, an exposure aperture and guide rails are formed. The exposure aperture determines an exposure area on the photo film, and the guide rails are disposed on both sides of the exposure aperture for guiding the photo film. A light-shielding segment is provided on the frame section to form a partition wall between the take-up chamber and a battery room.

Further, a guide plate is formed on the frame section for guiding an end of the photo film fed in the take-up chamber toward a periphery of a spool which is provided in the take-up chamber. Furthermore, a rear cover is attached to the main body with a hinge. In order to hold a shaft member of the hinge, a protrusion is formed on the outer cover section of the rear cover.

According to the invention, a light-shielding property of the take-up chamber is increased and the cost for producing the camera becomes lower. Further, as the partition wall and the like are integrated with the rear cover, the size of the camera becomes smaller.

BRIEF DESCRIPTION OF THE DRAWINGS

The above objects and advantages of the present invention will become easily understood by one of ordinary skill in the art when the following detailed description is read in connection with the accompanying drawings.

PREFERRED EMBODIMENTS OF THE INVENTION

Figure 1:
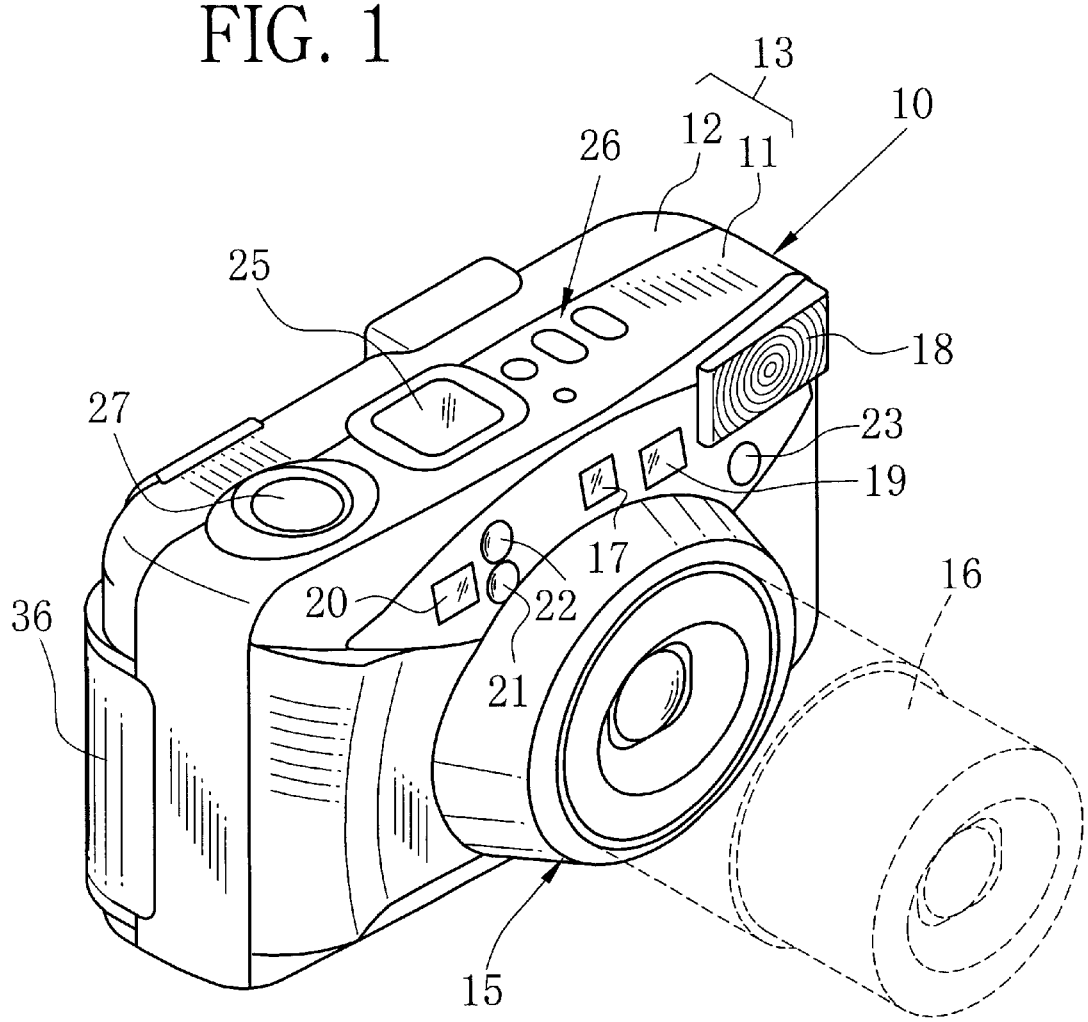
FIG. 1 is a perspective view of the camera showing the top, left and front sides thereof.

In FIG. 1, the camera is formed of a camera body 10 and a zoom lens 15. The camera body 10 includes a main body 62 (see FIG. 5) and a cover 13 covering the main body 62. The cover 13 has a front cover 11 and a rear cover 12, which are respectively attached onto front and rear surfaces of the camera body 10. The zoom lens 15 is retracted in the camera body 10 (as illustrated with a solid line) when the camera is not used. When the camera is used, the zoom lens 15 protrudes from the camera body 10 (as illustrated with a dotted line) by a motor (not shown). In the position illustrated with the dotted line, the zoom lens 15 is at the telephoto end. The camera body 10 is provided with a finder objective window 17, a flash light emitter 18, light projecting and receiving windows 19, 20 for auto-focusing, a light emitting window 21 for preventing the red eye effect, a photo measuring window 22 for automatic exposure and an indication window 23 for a self-timer.

On a top surface of the camera body 10, an LCD panel 25, an operation button 26 and a shutter releasing button 27 are formed. On the LCD panel 25, a number of remaining picture frames, a mark of the photographic mode, a date and the like are indicated. When the operation button 26 is pushed, photographic conditions, such as photographic mode, are set.

Figure 2:
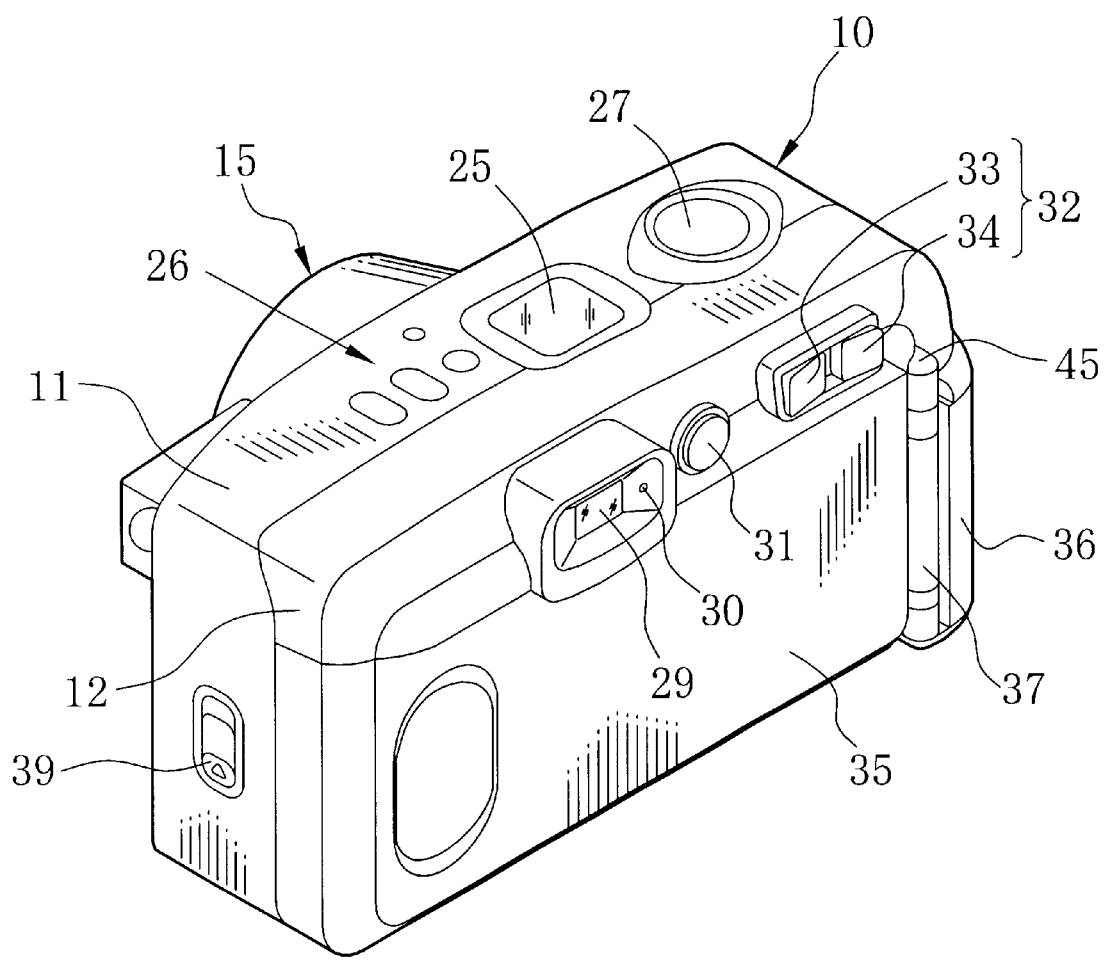
FIG. 2 is a perspective view of the camera showing the top, right and rear sides thereof.

As shown in FIG. 2, in the upper side of a rear surface of the camera body 10 are positioned a finder eye-piece window 29, a light emitting portion 30, a switch button 31, and zooming buttons 33, 34. From the light emitting portion 30, a light is emitted when the measuring of the distance to the photographic subject is complete. When the zooming button 33 is pushed, the motor drives to shift the movable lens barrel 16 toward the camera body 10 such that a wide-angle photograph may be taken. When the zooming button 34 is pushed, the motor drives to shift the movable lens barrel 16 so as to protrude from the camera body 10 and thus enables a telephoto photograph to be taken.

A rear lid 35 and a battery room lid 36 are attached to a rear surface of the camera body 10 with a hinge 37. In order to load and unload a film cartridge 38, an operation member 39 disposed on a side surface of the camera body 10 is slid upwards to open the rear lid 35. After loading or unloading the film cartridge 38, the rear lid 35 is closed, and the inside of the camera body 10 is kept in a light-tight fashion. Further, when batteries are loaded and unloaded, the battery room lid 36 is opened.

Figure 3:
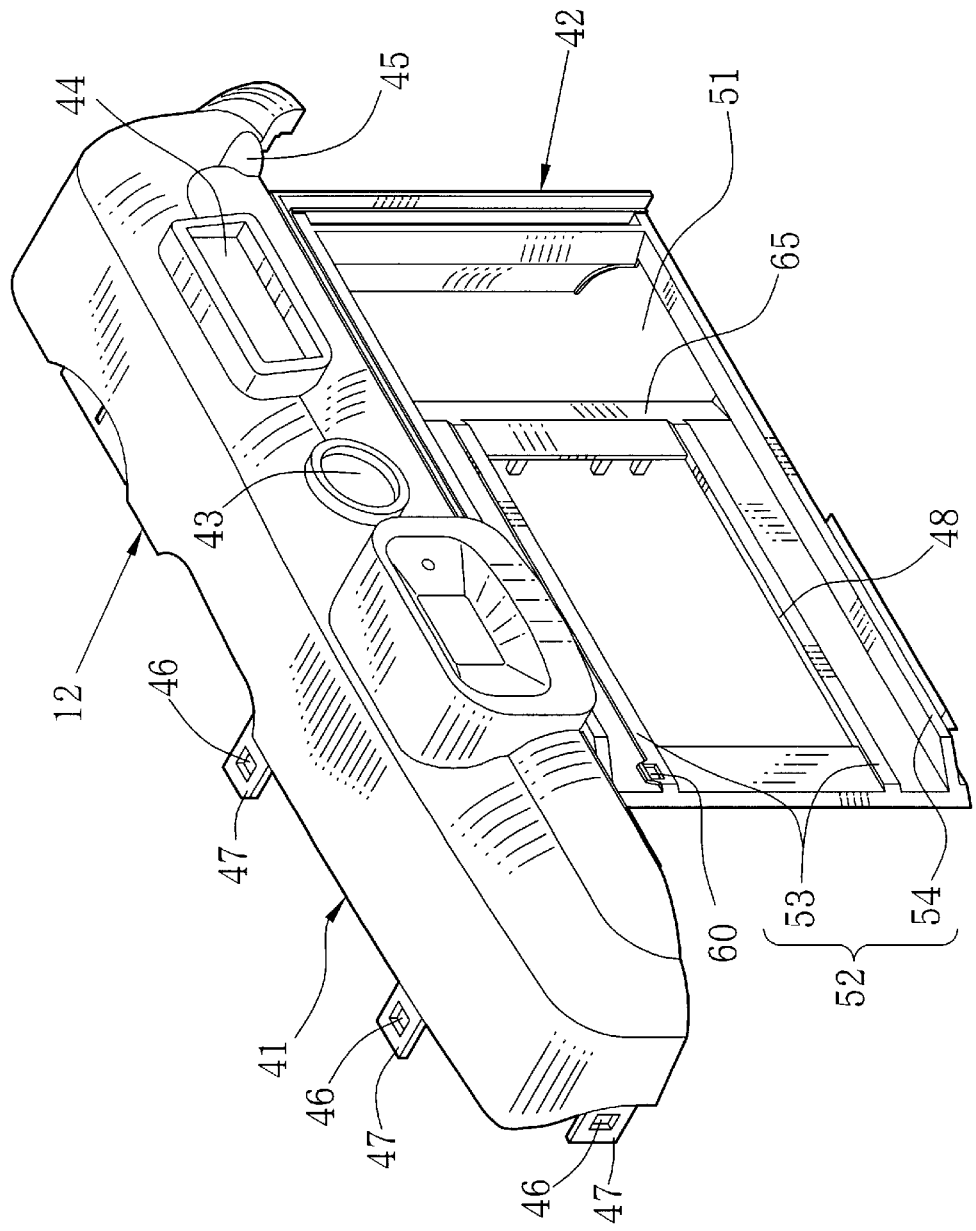
FIG. 3 is a perspective view of the exterior side and top portion of a rear cover of the camera.

As shown in FIG. 3, the rear cover 12 is formed of plastics which is less rigid than that used for the main body 62. An outer section 41 and a frame section 42 are integrated with the rear cover 12. The outer section 41 forms a part of the exterior surface of the camera body 10, and the frame section 42 is covered with the rear lid 35 (FIG. 2) when it is closed. The outer section 41 is provided with the finder eye-piece window 29 and openings 43, 44 for switch button 31 and a zoom lens operating section 32. A protrusion 45 is formed at a position to contact to a top of the hinge 37 (see FIG. 2), in order to hold a shaft of the hinge 37. The outer section 41 has also engaging segments 47 in which holes 46 are formed. The holes 46 are engaged with protuberances (not shown) formed in an inner surface of the front cover 11.

Figure 5:
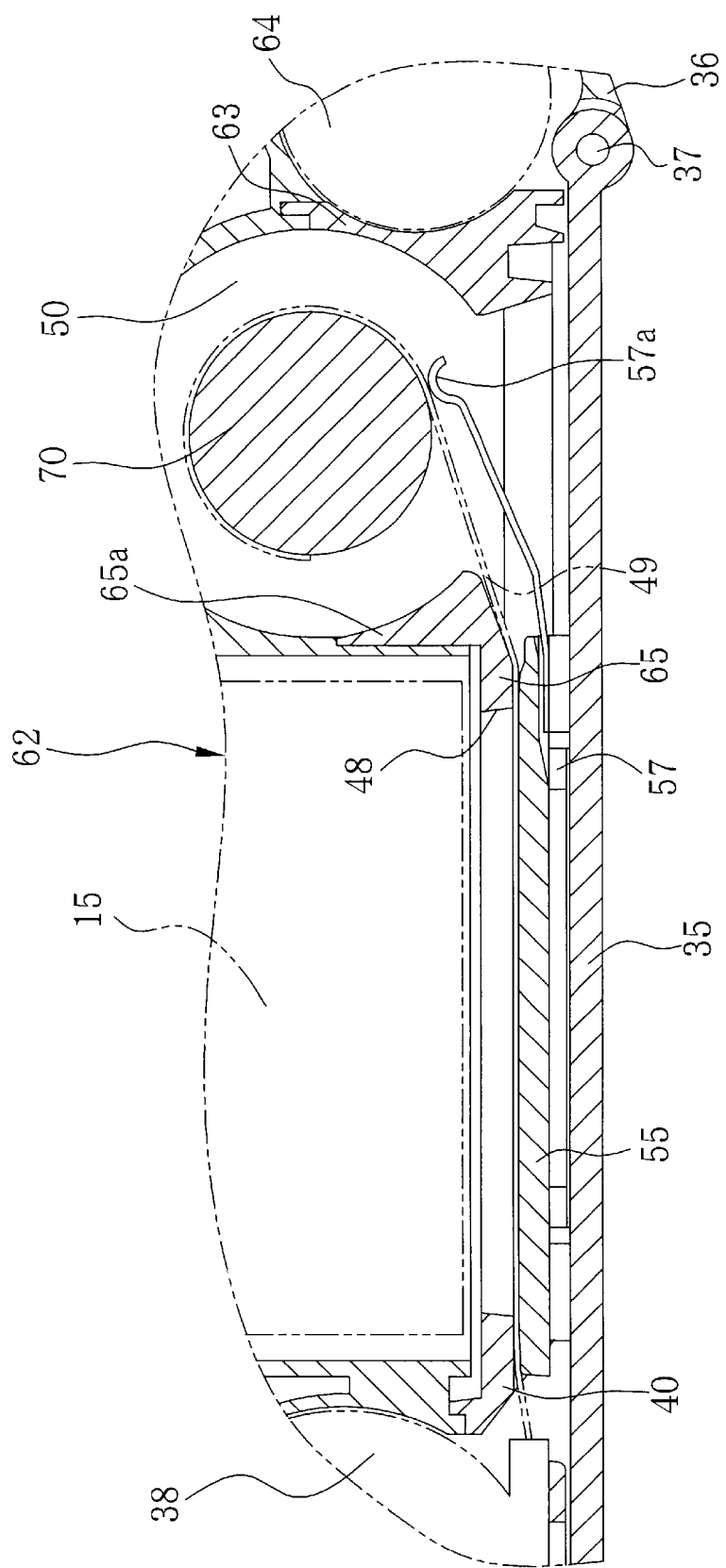
FIG. 5 is a cross sectional view of the camera.

The frame section 42 has an exposure aperture 48 and a feed opening 51 for feeding the photo film 49 to the take-up chamber 50 (FIG. 5). At upper and lower positions of the exposure aperture 48, guide rails 52 are provided. The guide rails 52 consist of inner rails 53 and outer rails 54. The outer rails 54 receive a film pressure plate 55 (see FIGS. 5 and 6) and form a film passage way 56 between the film pressure plate 55 and the frame section 42. In the film passage way 56, the photo film 49 is located at a predetermined position behind the exposure aperture 48, and an image of an object is focused on the photo film 49.

Figure 4:
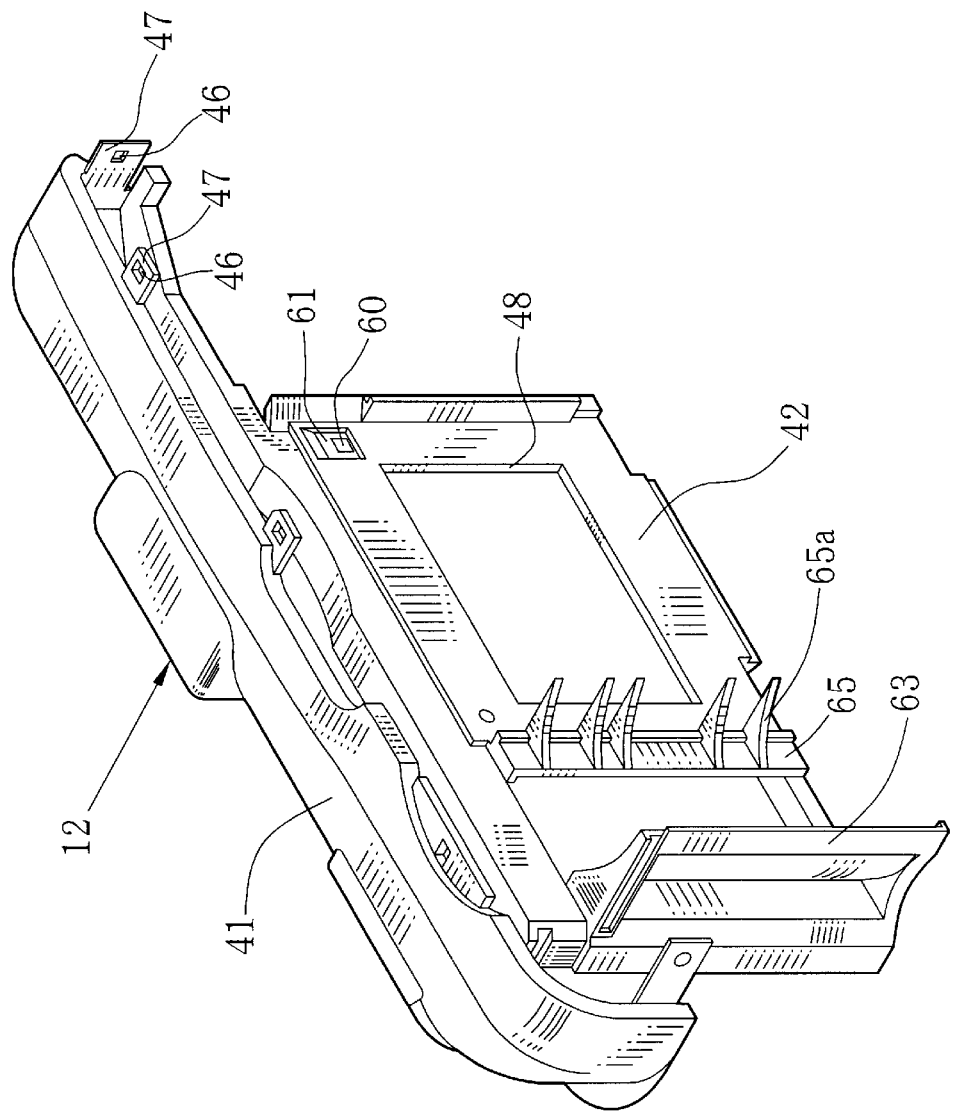
FIG. 4 is a perspective view of the interior side and top portion of the rear cover illustrated in FIG. 3.

There is an opening 60 on the inner rail 53 forming a top edge of the exposure aperture 48. The opening 60 is used for detecting perforations formed on the photo film 49. As shown in FIG. 4, a recess 61 is formed in another side of the opening 60. A detection sensor 58 is thrust in the recess 61 and attached to the main body 62. Namely, the recess 61 receives the detection sensor 58.

Further, the frame section 42 has a light-shielding segment 63 (FIG. 4) and a guide plate 65. As shown in FIG. 5, the light-shielding segment 63 forms a part of a partition wall between the take-up chamber 50 and a battery room 64 that is positioned on the outer side of the take-up chamber 50. The take-up chamber 50 is kept in a light-tight fashion by the partition wall. The guide plate 65 has a plurality of nearly triangular blades 65a and is formed between the exposure aperture 48 and the feed opening 51 in order to guide the photo film 49 fed in the take-up chamber 50 toward a spool 70. The photo film 49 is pressed on the spool 70 by an end portion 57a of a film pressing spring 57. The film pressing spring 57 is fixed to an inner surface of the rear lid 35, and the end portion 57a has an arc-shaped form. The photo film 49 which is pressed on the spool 70 by the film pressing spring 57 is wound on a periphery of the spool 70 when it is rotated.

Figure 6:
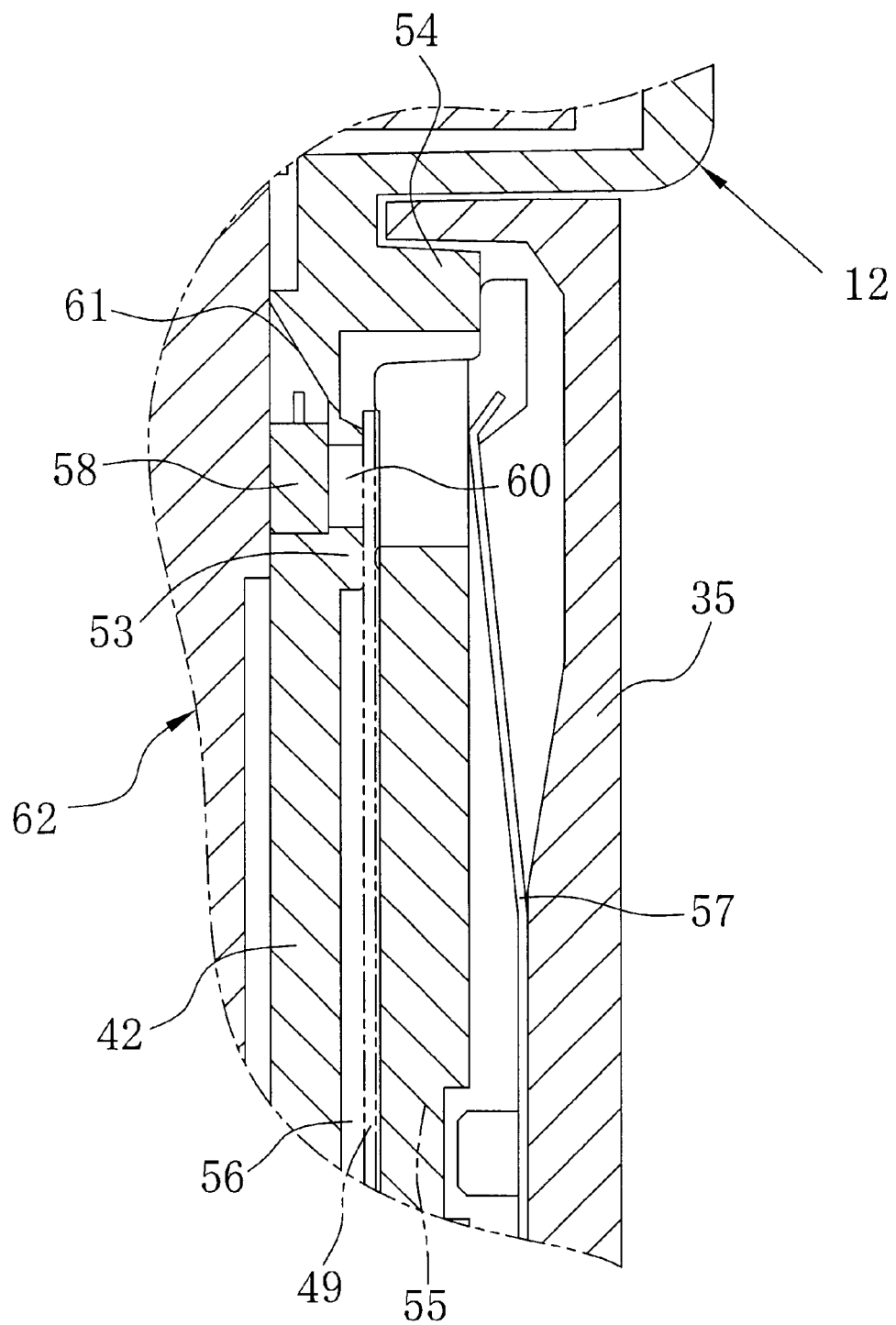
FIG. 6 is a longitudinal sectional view of the camera illustrating positions of a detection sensor and an opening therefore.

The effects of the present invention will now be described. As shown in FIG. 5, the take-up chamber 50 and the battery room 64 are separated when the rear cover 12, including the light-shielding segment 63 and guide plate 65, is attached to the main body 62 in which several photographic mechanisms are provided. Further, the guide plate 65 guides the photo film 49 on winding the photo film 49. Furthermore, as shown in FIG. 6, the opening 60 formed in the inner rail 53 is used for detecting the perforations by the detection sensor 58. The recess 61 formed around the opening 60 holds the detection sensor 58.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A camera including a main body and a rear cover attached to said main body, said main body being provided with a cassette chamber and a take-up chamber in respective both sides, said rear cover comprising:

an outer cover section for covering a part of said main body;

a frame section having an exposure aperture for determining an exposure area on a photo film and guide rails for guiding said photo film behind said exposure aperture; and a light-shielding segment formed on said frame section, for forming a partition wall between said take-up chamber and a battery room;

wherein said frame section further includes a guide plate for guiding an end of said photo film fed in the take-up chamber toward a periphery of a spool provided in said take-up chamber;

said frame section further includes an opening used for detecting perforations formed on said photo film.

2. The camera as set forth in claim 1, said opening including a recess that surrounds the opening on one side of the frame section.

3. A camera including a main body and a rear cover attached to said main body, said main body being provided with a cassette chamber and a take-up chamber in respective both sides, said rear cover comprising:

an outer cover section for covering a part of said main body;

a frame section having an exposure aperture for determining an exposure area on a photo film and guide rails for guiding said photo film behind said exposure aperture; and a light-shielding segment formed on said frame section, for forming a partition wall between said take-up chamber and a battery room;

wherein said frame section further includes a guide plate for guiding an end of said photo film fed in the take-up chamber toward a periphery of a spool provided in said take-up chamber;

said frame section further includes an opening used for detecting perforations formed on said photo film;

a rear lid is attached to said main body through a hinge; and protrusions are formed on said outer cover section to hold a shaft member of said hinge.

4. A camera described in claim 3, wherein said frame section has outer rails and inner rails which are disposed outside of said exposure aperture, said outer rails receive a film pressure plate of said rear lid and form a film passage way through which said photo film passes behind said exposure opening, and said inner rails contact to said photo film to regulate a position thereof.

5. A camera described in claim 4, wherein said rear cover is a plastic molded article.

\* \* \* \* \*